UNITED STATES PATENT OFFICE.

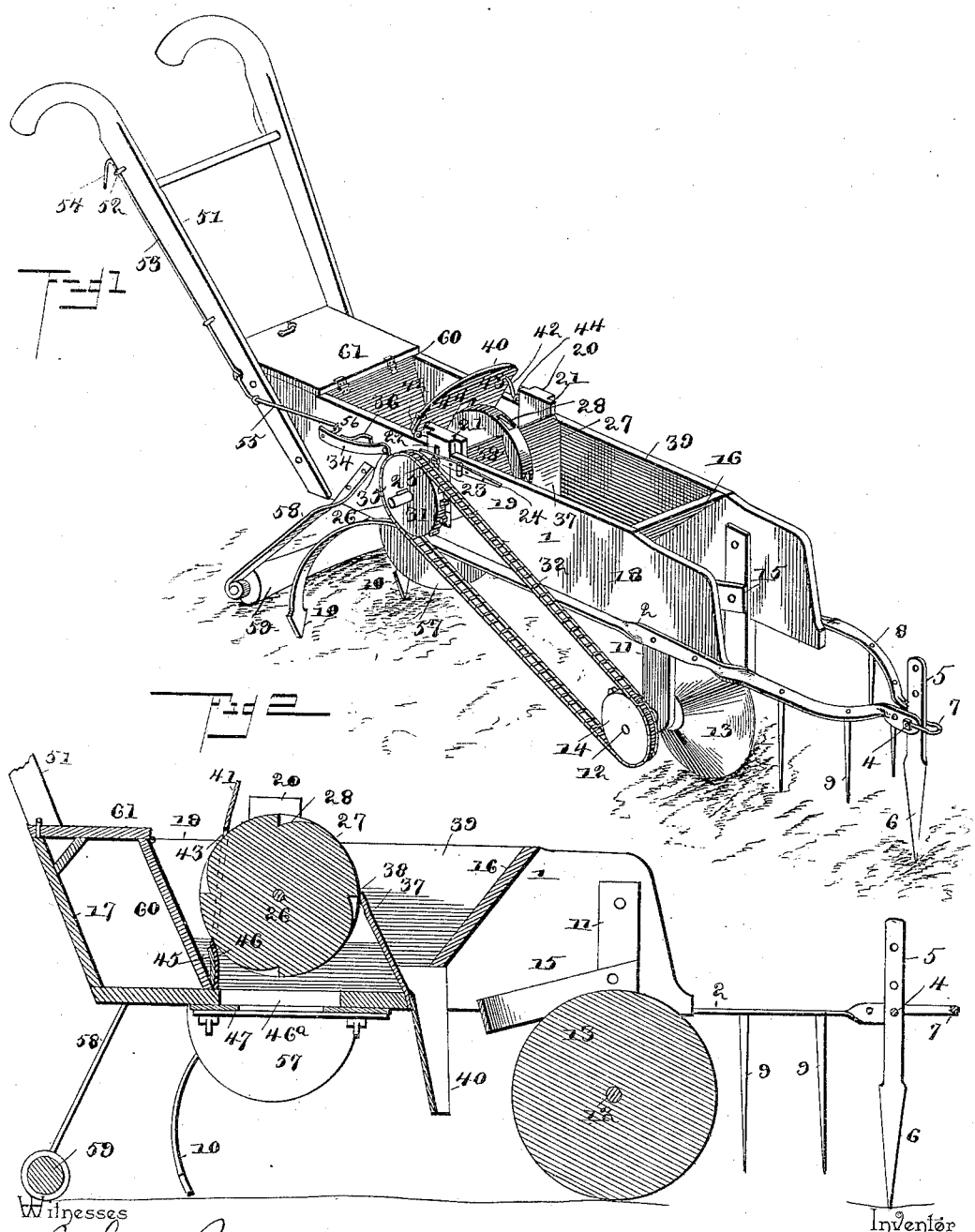

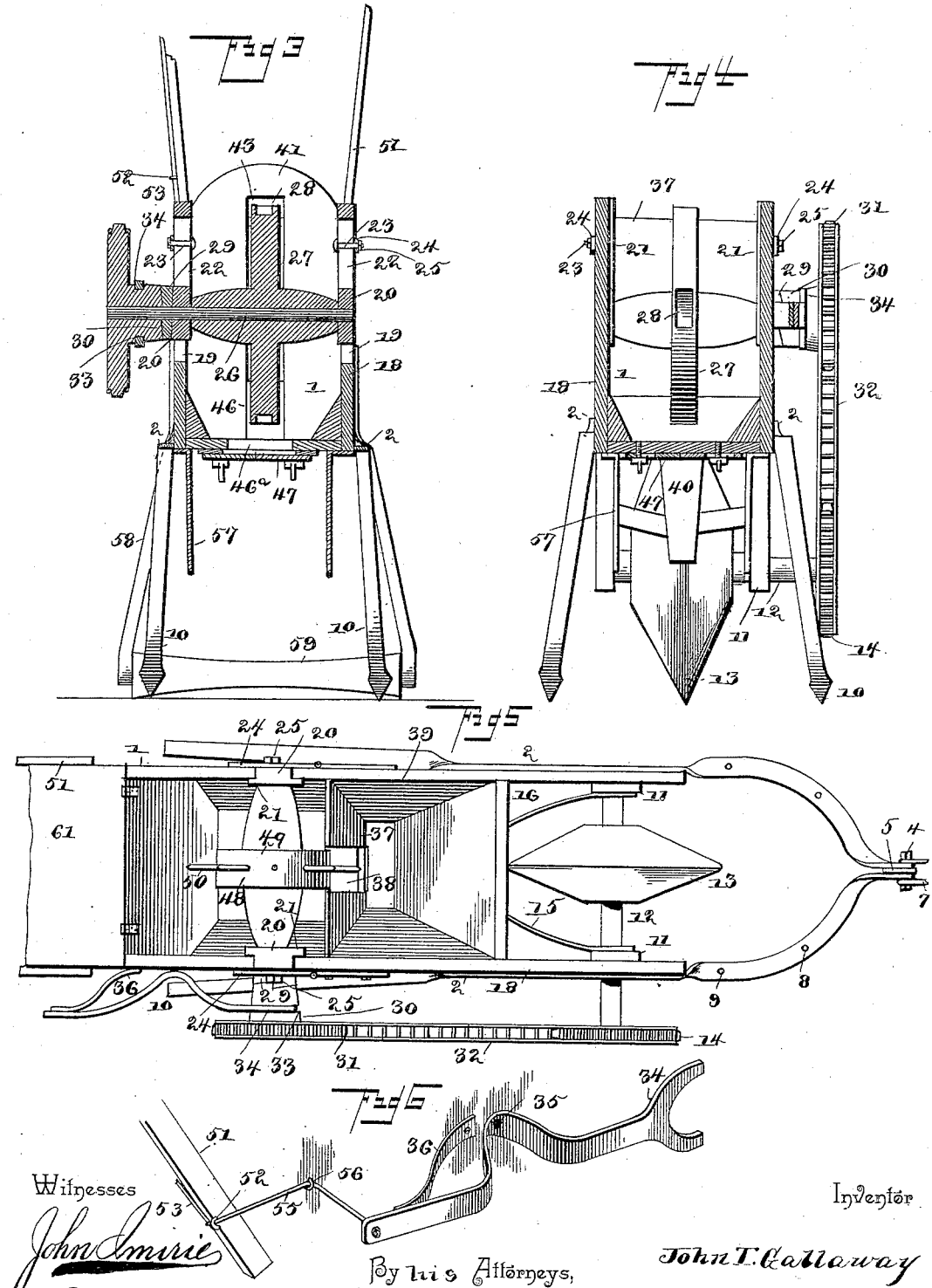

JOHN TYLER GALLAWAY, OF ALVORD, TEXAS.

SEED-PLANTER AND FERTILIZER-DISTRIBUTER.

SPECIFICATION forming part of Letters Patent No. 418,174, dated December 31, 1889.

Application filed September 28, 1889. Serial No. 325,430. (No model.)

*To all whom it may concern:*

Be it known that I, JOHN TYLER GALLAWAY, a citizen of the United States, residing at Alvord, in the county of Wise and State of Texas, have invented a new and useful Seed-Planter and Fertilizer, of which the following is a specification.

This invention relates to seed-planters and fertilizer-distributers; and it has for its object to provide a machine of this class which may be used interchangeably for planting different kinds of seeds—such as corn, peas, cotton, or other seeds—or fertilizing material, and which shall be simple in construction, durable, and easily manipulated.

With these ends in view the invention consists in the improved construction, arrangement, and combination of parts, which will be hereinafter fully described, and particularly pointed out in the claims.

Referring to the drawings, Figure 1 is a perspective view of a seed-planter embodying my improvements, and showing it arranged for planting corn. Fig. 2 is a longitudinal vertical sectional view of the same. Fig. 3 is a vertical transverse sectional view taken through the seed-wheel of the machine. Fig. 4 is a vertical transverse sectional view taken in rear of the seed-wheel and looking in a forward direction. Fig. 5 is a top plan showing the machine arranged for planting cotton or fertilizing material. Fig. 6 is a detail side view of a portion of the machine, illustrating the clutch mechanism and the mechanism for operating the same.

Like numerals of reference indicate like parts in all the figures of the drawings.

The frame of my improved seed-planter is composed of a box 1, to the sides of which at their front ends are bolted the straps 2 2, the front ends of which are extended forwardly until they converge at their front ends, which are bolted together. Upon the bolt 4, which connects the front ends of the straps 2 2, is mounted a vertically-adjustable shank 5, the lower end of which carries the furrow 6. A clevis 7, for the attachment of the draft, is likewise mounted upon the bolt 4. The front ends of the straps 2, which extend in advance of the frame, have quarter-twists to bring the said straps into a horizontal plane, and they are provided with perforations 8, to receive the harrow-teeth 9, which may be secured in any suitable manner, and which serve to pulverize the soil in advance of the machine. The rear ends of the straps 2 are likewise quarter-twisted and extend rearwardly to form the spring-teeth 10, which act as coverers.

The front end of the box, which constitutes the frame of the machine, is provided with downwardly-extending brackets 11, having bearings for the shaft or axle 12, upon which the furrow-wheel 13 is securely mounted. One end of the said axle is also provided with a sprocket-wheel 14, from which motion may be communicated to the seeding mechanism, as will be presently described. Between the brackets 11 is secured a scraper 15, which serves to remove any dirt which may adhere to the furrow-wheel.

Between the front and rear ends of the sides of the box 1 are secured the rearwardly and forwardly inclined end pieces 16 and 17, which constitute, respectively, the front and the rear end of the hopper.

The sides 18 of the box 1 are provided with vertical slots 19, in which are mounted the vertically-adjustable slides 20. The said slides are provided on their inner sides with flanges 21, which are of such dimensions that the slots 19 shall be fully covered at any adjustment of the said slides, and the latter are provided with vertical slots 22, through which extend bolts 23, the outer ends of which pass through straps 24, hinged to the sides 18 of the box, so that by tightening the nuts 25 upon the said bolts the slides 20 may be secured firmly at any desired adjustment.

The lower ends of the slides 20 have bearings for the transverse shaft 26, carrying the seed-wheel 27, which is provided at its circumference with tangential seed-cups 28, which may be of any suitable dimensions for conveying different quantities of seeds. The shaft 26 is provided with a clutch 29, adapted to be engaged by a clutch-collar 30, formed upon the inner side of a transversely-sliding sprocket-wheel 31, which is feathered upon the shaft 26, so as to cause the latter to rotate therewith. The sprocket-wheel 31 is connected by a chain 32 with the sprocket-wheel 14 upon the axle of the machine to receive motion therefrom. The clutch-collar 30 upon the sprocket-wheel 31 is provided with an annular groove 33, engaging a bifurcated lever 34, which is connected to the side of the machine by means of a bolt 35 in such a manner as to enable the said lever to vibrate freely. The rear end of the lever 34 is normally forced in an outward direction by means of a suitably-arranged spring 36, thereby normally holding the clutch-collar of the sprocket-wheel in engagement with the clutch. It will be seen that, owing to the arrangement of the operating-lever 34 as herein described, its bifurcated front end will remain in engagement with the annularly-grooved clutch of the sprocket-wheel 31 at any position to which the latter may be vertically adjusted by means of the slides 20, in which the shaft 26, carrying the said sprocket-wheel, is mounted.

In the front end of the hopper is arranged an inclined plate 37, having a slot 38 for the front end of the seed-wheel. In the front end of the hopper are also arranged inclined side plates 39, converging in a downward direction to the discharge-spout 40, which is secured at the front end of the hopper, as shown. In the rear end of the hopper is arranged an inclined partition-plate 41, which is secured detachably by means of hooks 42 at its upper end engaging staples 44 upon the sides of the hopper. The plate 41 has a slot 43, through which the rear end of the seed-wheel extends. At the lower end of said slot is secured a spring 45, pressing against a plate 46, of leather or other flexible material, which is thereby forced against the periphery of the seed-wheel, so as to form a cut-off. The seeds which are to be planted, being placed in the hopper, are lifted by the cups or depressions in the seed-wheel, superfluous seeds being removed by the cut-off just described, and the contents of the seed-cups are successively discharged over the inclined front plate 37 into the discharge-spout by which the seeds are conveyed to the furrow.

The bottom of the hopper is provided with a longitudinal slot 46$^a$, adjacent to the sides and ends of which are secured adjustable plates 47, by means of which the size of the said slot may be regulated, or it may be entirely closed. When the machine is used as a corn-planter, the slot 46$^a$ is completely closed; but when it is to be used for dropping cotton or fertilizing material the slides 47 are adjusted at suitable distances apart so as to form a slot of the required size, and a feeding-wheel 48, consisting of a hub 49, having radially-extending spokes 50, is substituted for the seed-wheel. The inclined plate 41 is then likewise removed and the machine is now ready for planting cotton or fertilizing material, as will be readily understood.

To the rear end of the frame of the machine are secured handles 51, of ordinary construction, and in staples 52 upon the outer side of one of said handles is mounted a sliding rod 53, the upper end of which has a handle 54 and the lower end of which is connected by a flexible strap or cord 55, passing through suitable guide-eyes 56, with the rear end in contact with the clutch-lever 34, which may thus be conveniently manipulated by the operator so as to throw the clutch of the sprocket-wheel 31 out of engagement with the clutch 39 upon the shaft 26, and thus suspend the operation of the machine when the latter is to be turned at the end of the row or at any other time. When the sliding bar 53 is released, the spring 36 will automatically restore the clutch mechanism to an operative position.

To the under side of the hopper on each side of the slot 46 are secured shields or guard-plates 57, which serve in windy weather to prevent the seed or fertilizing material from being blown aside before it reaches the furrow.

Arms or brackets 58, secured to the side of the machine at its rear end and extending downwardly and rearwardly, carry a covering-roller 59, of ordinary construction. A drag or covering-plows may be substituted for said roller, when desired.

At the rear end of the box which constitutes the frame of the machine is constructed a tool-box 60, having a hinged cover 61, and in which an oil-can and various tools may be conveniently kept.

From the foregoing description, taken in connection with the drawings hereto annexed, the operation and advantages of my improved seed-planter will be readily understood. Its construction is simple and inexpensive, and it will be seen that it may be readily adapted by simply changing the seed-wheel to plant any of the ordinary varieties of seeds and in any desired quantity. The mechanism for throwing the seed-dropping mechanism into and out of gear is exceedingly simple and easily controlled, and the general construction of the machine is such that it is not liable to get out of order by ordinary usage.

Having thus described my invention, what I claim is—

1. In a seed-planter, the combination of the box constituting the frame of the machine, the straps secured to the sides of the same and having quarter-twisted portions and extended rearwardly to form spring teeth or coverers, the harrow-teeth mounted in perforations in the forwardly-extending horizontal front ends of said straps, a bolt connecting the extreme converging front ends of the latter, and a shank adjustable vertically upon the said bolt between the said straps, substantially as and for the purpose set forth.

2. The combination of the box or hopper constituting the frame of the machine and having vertically-slotted sides, the flanged slides adjustable vertically in the said slots, the plates hinged to the outer sides of the hopper, the adjusting-bolts extending through slots in the slides and through the said hinged plates, a shaft journaled in the said slides and carrying a suitably-constructed seed-wheel, and mechanism for transmitting motion to said shaft from the axle of the machine, substantially as set forth.

3. The combination of the box or hopper having vertical-slotted sides, the slides adjustable vertically in the same and having a shaft journaled in their lower ends, a seed-wheel mounted upon the said shaft, a clutch secured upon the latter, a transversely-sliding sprocket-wheel feathered upon the said shaft and having an annularly-grooved clutch-collar to engage said clutch, a spring-actuated bifurcated lever engaging said annularly-grooved clutch-collar, said lever being mounted to vibrate freely upon its fulcrum, a sliding rod attached to one of the handles of the machine, and a flexible strap passing through suitable guide-eyes and connecting said slide-rod with the clutch-operating lever, substantially as set forth.

4. The combination of the hopper or seed-box, the vertically-adjustable slides, a shaft journaled in the said slides and carrying a seed-wheel having tangential seed-cups, a slotted inclined partition arranged in the front end of the hopper and leading to the discharge-spout, a slotted partition-plate arranged in the rear end of the hopper and having a spring-pressed flexible lip or cut-off bearing against the periphery of the seed-wheel, and mechanism for transmitting motion to the latter from the axle of the machine, substantially as herein set forth.

5. The combination, with the hopper having the vertically-adjustable slides carrying the shaft and seed-wheel, of an inclined partition-plate mounted detachably in the rear end of the hopper and having a slot, a spring secured at the lower end of said slot, and a flexible lip forced by pressure of the said spring into contact with the periphery of the seed-wheel, substantially as herein set forth.

6. The combination of the hopper having a slotted bottom, the slides arranged adjustably at the sides and ends of said slot, the shields or guard-plates extending downwardly from the bottom adjacent to the said slot, and the vertically-adjustable slides carrying the shaft and seeding mechanism, substantially as and for the purpose set forth.

In testimony that I claim the foregoing as my own I have hereto affixed my signature in presence of two witnesses.

JOHN TYLER GALLAWAY.

Witnesses:
H. G. BEGLEY,
D. E. WISE.